United States Patent
Sethian et al.

[19]

[11] Patent Number: 6,018,499
[45] Date of Patent: Jan. 25, 2000

[54] THREE-DIMENSIONAL SEISMIC IMAGING OF COMPLEX VELOCITY STRUCTURES

[75] Inventors: James A. Sethian, San Francisco; Alexander M. Popovici, Portola Valley, both of Calif.

[73] Assignee: 3DGeo Development, Inc., Mountain View, Calif.

[21] Appl. No.: 09/175,743

[22] Filed: Oct. 20, 1998

Related U.S. Application Data

[60] Provisional application No. 60/064,213, Nov. 4, 1997.

[51] Int. Cl.$^7$ .................................................. G01V 1/36
[52] U.S. Cl. ............................... 367/72; 367/73; 367/53; 364/421
[58] Field of Search .................................. 367/50, 51, 52, 367/72, 73, 53; 364/421

[56] References Cited

U.S. PATENT DOCUMENTS 5,513,150   4/1996   Sicking et al. .............................. 367/73

OTHER PUBLICATIONS

P.G.Ciarlet (Cambridge monographs on Applied and computational mathematics) 1996, pp. 55–56.

BEVC, "Imaging Complex Structures with First–Arrival Traveltimes," Technical Program, p. 1189–1192, Society of Exploration Geophysicists (SEG) International Exposition and 65$^{th}$ Annual Meeting, Oct. 8–13, 1995, Houston.

Cao et al., "Finite Difference Solution of the Eikonal Equation using an Efficient, First–Arrival, Wavefront Tracking Scheme," *Geophysics* 59(4):623–643 (1994).

Cerveny, "Ray Tracing Algorithms in Three–Dimensional laterally–Varying Layered Structures," *Seismic Tomography* (ed. G. Nolet), p. 99–133, Riedel Publishing Company, 1987.

Dellinger et al., "Anisotropic Finite–Difference Traveltimes using a Hamilton–Jacobi Solver," Technical Program p. 1786–1789, Society of Exploration Geophysicists (SEG) International Exposition and 66$^{th}$ Annual Meeting, Nov. 10–15, 1996, Denver.

Fei et al., "Finite–Difference Solutions to the 3–D Eikonal Equation," Technical Program, p. 1129–1132, Society of Exploration Geophysicists (SEG) International Exposition and 65$^{th}$ Annual Meeting, Oct. 8–13, 1995, Houston.

Fei et al., "Depth Migration Artifacts Associated with First–Arrival Traveltimes," Technical Program, p. 499–500, Society of Exploration Geophysicists (SEG) International Exposition and 66$^{th}$ Annual Meeting, No. 10–15, 1996, Denver.

(List continued on next page.)

*Primary Examiner*—Christine K. Oda
*Assistant Examiner*—Anthony Jolly
*Attorney, Agent, or Firm*—Andrei D. Popovici

[57] ABSTRACT

Accurate and reliable traveltimes for a seismic exploration volume having a complex velocity structure are generated by selectively advancing a traveltime front at its minimum traveltime grid point, using an entropy-satisfying finite-difference approximation to the eikonal equation. A narrow band propagation zone is used to advance the finite difference stencil. Tentative traveltimes for the narrow band adjacent to the traveltime front are computed using the eikonal equation and arranged on a heap. The minimum traveltime (top of the heap) is selected as an accepted traveltime, saved in the output table, and removed from the heap. Tentative traveltimes for all non-accepted grid points neighboring the selected point are then computed/recomputed and put on the heap. The traveltime computation is fast, unconditionally stable, resolves any overturning propagation wavefronts, and ensures that the eikonal equation is globally solved for each point of the 3-D grid. The traveltimes accurately characterize the propagation of seismic signals through the volume. The traveltimes are used for accurately imaging the volume.

26 Claims, 9 Drawing Sheets

OTHER PUBLICATIONS

Fowler, "Finite–Difference Solution of the 3–D Eikonal Equation in Spherical Coordinates," Technical Program, p. 1394–1397, Society of Exploration Geophysicists (SEG) International Exposition and 65$^{th}$ Annual Meeting, Oct. 8–13, 1995, Houston.

Gray, "Efficient Traveltime Calculations for Kirchhoff Migration," *Geophysics* 51(8):1685–1688 (1986).

Gray et al., "Kirchhoff Migration using Eikonal Equation Traveltimes," *Geophysics* 59(5):810–817 (1994).

Kästner, "Accurate Finite–Difference Calculations of Traveltimes and Amplitudes in 3–D," Technical Program, p. 1782–1785, Society of Exploration Geophysicists (SEG) International Exposition and 66$^{th}$ Annual Meeting, No. 10–15, 1996, Denver.

Kessler et al., "Mixed–Grid Solution of the 3–D Eikonal Equation," Technical Program, p. 1133–1136, Society of Exploration Geophysicists (SEG) International Exposition and 65$^{th}$ Annual Meeting, Oct. 8–13, 1995, Houston.

Moser, "Shortest Path Calculation of Seismic Rays," *Geophysics* 56(1):59–67 (1991).

Nichols, "Maximum Energy Traveltimes Calculated in the Seismic Frequency Band," *Geophysics* 61(1):253–263 (Jan.–Feb. 1996).

PICA, "Fast and Accurate Finite–Difference Solutions of the 3–D Eikonal Equation Parametrized in Celerity," Technical Program, p. 1774–1777, Society of Exploration Geophysicists (SEG) International Exposition and 66$^{th}$ Annual Meeting, Nov. 10–15, 1996, Denver.

Qin et al., "Finite–Difference Solution of the Eikonal Equation Along Expanding Wavefronts," *Geophysics* 57(3):478–487 (1992).

Reshef et al., "Migration of Common Shot Gathers," *Geophysics* 51(2):324–331 (1986).

Riahi et al., "3–D Interpretation of Reflected Arrival Times by Finite–Difference Techniques," *Geophysics* 59(5):844–849 (1994).

Schneider, "Robust and Efficient Upwind Finite–Difference Traveltime Calculations in Three–Dimensions," *Geophysics* 60(4):1108–1117 (1995).

Schneider et al., "A Dynamic Programming Approach to First Arrival Traveltime Computation in Media with Arbitrarily Distributed Velocities," *Geophysics* 57(1):39–50 (1992).

Sethian, *Level Set Methods*, p. i–xviii, 1–95, 169–183 (Ch. 1–9, 16), *Cambridge Monographs on Applied and Computational Mathematics*, v. 3, ed. Ciarlet et al., Cambridge University Press, 1996.

Van Trier et al., "Upwind Finite–Difference Calculation of Traveltimes," *Geophysics* 56(6):812–821 (1991).

Vidale, "Finite–Difference Calculation of Traveltimes in Three Dimensions," *Geophysics* 55(5):521–526 (1990).

Vinje et al., "Traveltime and Amplitude Estimation using Wavefront Construction," *Geophysics* 58(8):1157–1166 (1993).

Yilmaz et al., "Ray Tracing using Huygens' Principle," Technical Program, p. 1794–1797, Society of Exploration Geophysicists (SEG) International Esposition and 66$^{th}$ Annual Meeting, Nov. 10–15, 1996, Denver.

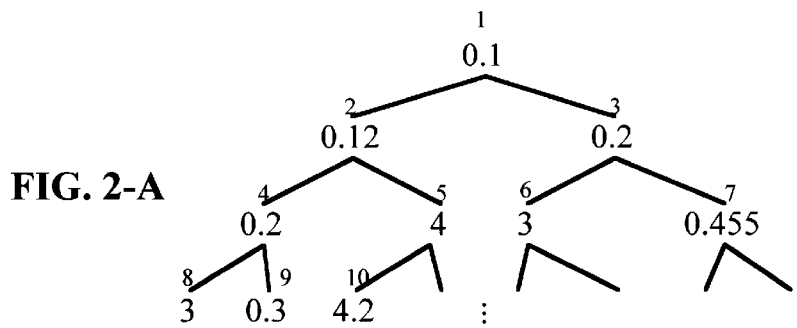
FIG. 2-A
FIG. 2-B
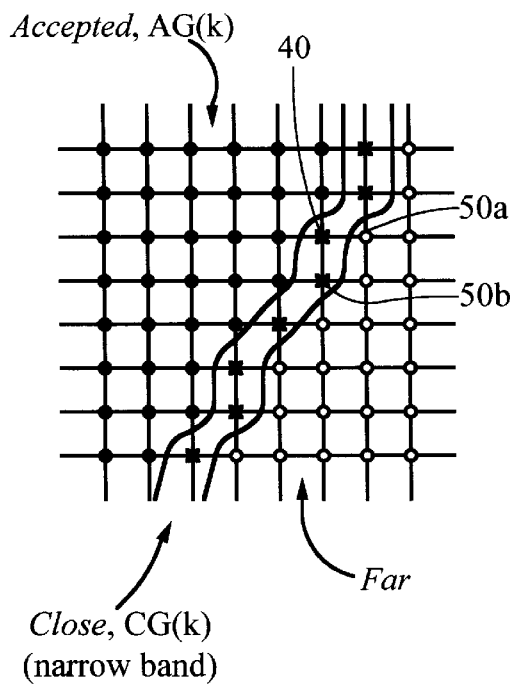
FIG. 3-A
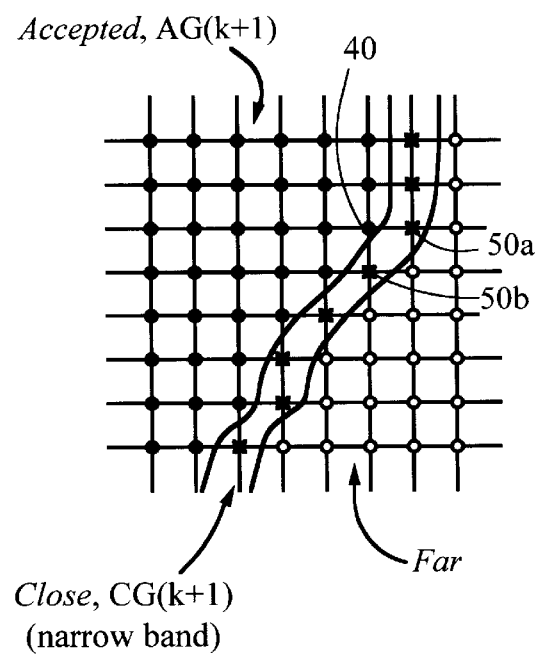
FIG. 3-B

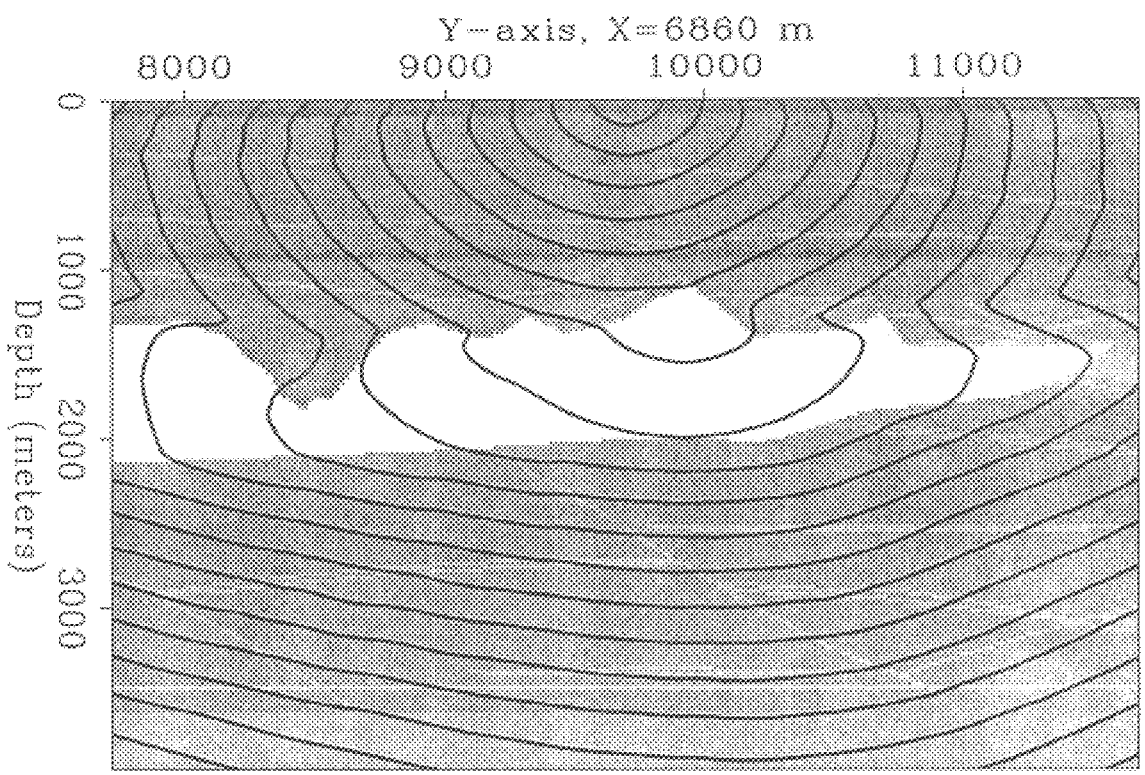
FIG. 5-A

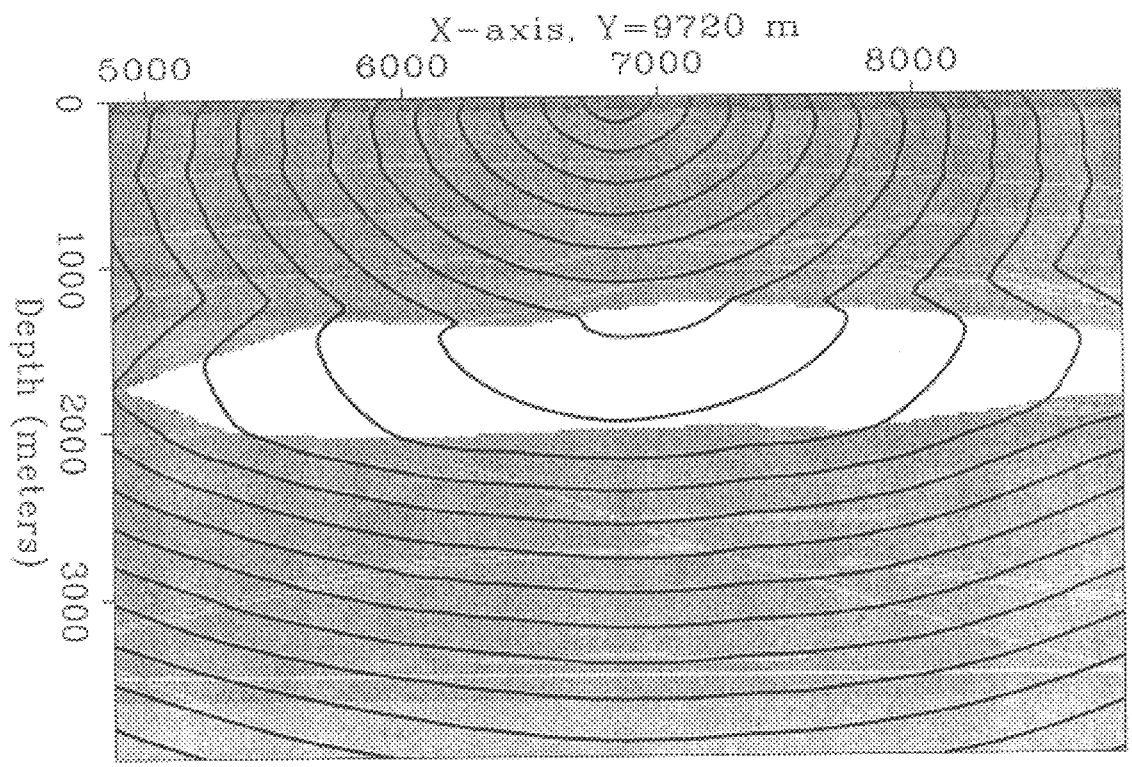
FIG. 5-B

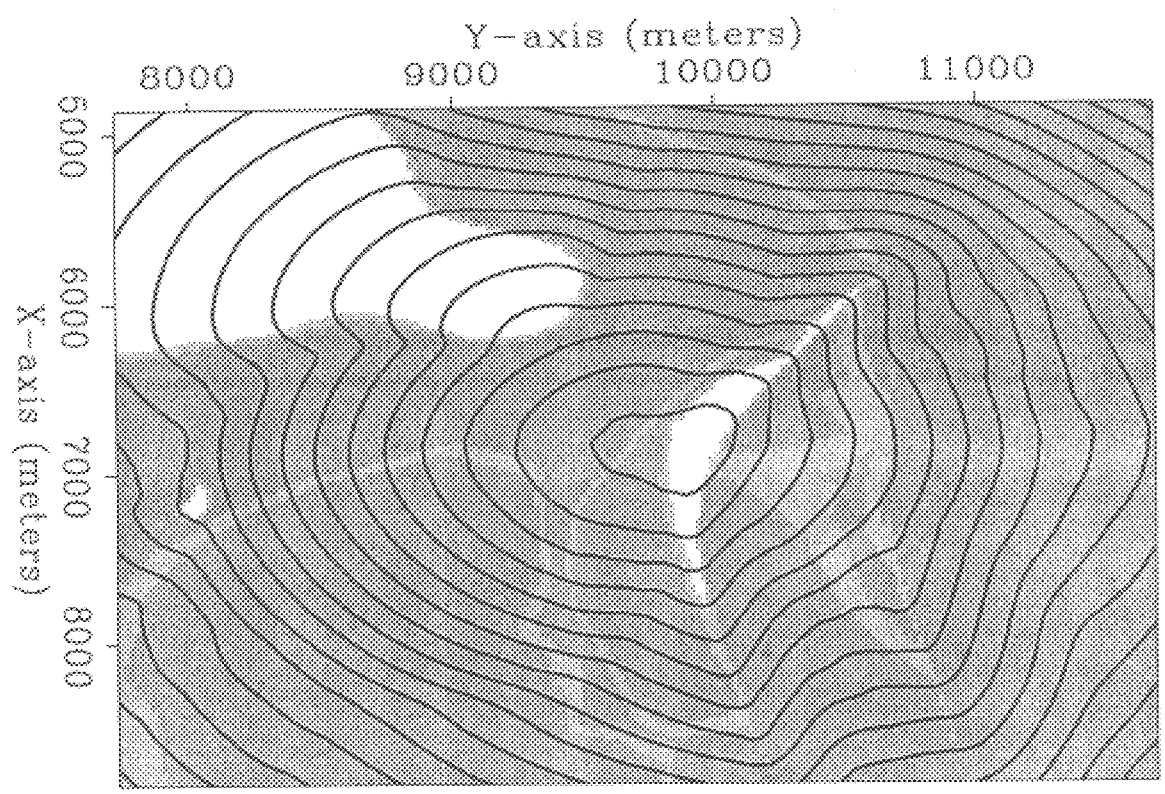
FIG. 6-A

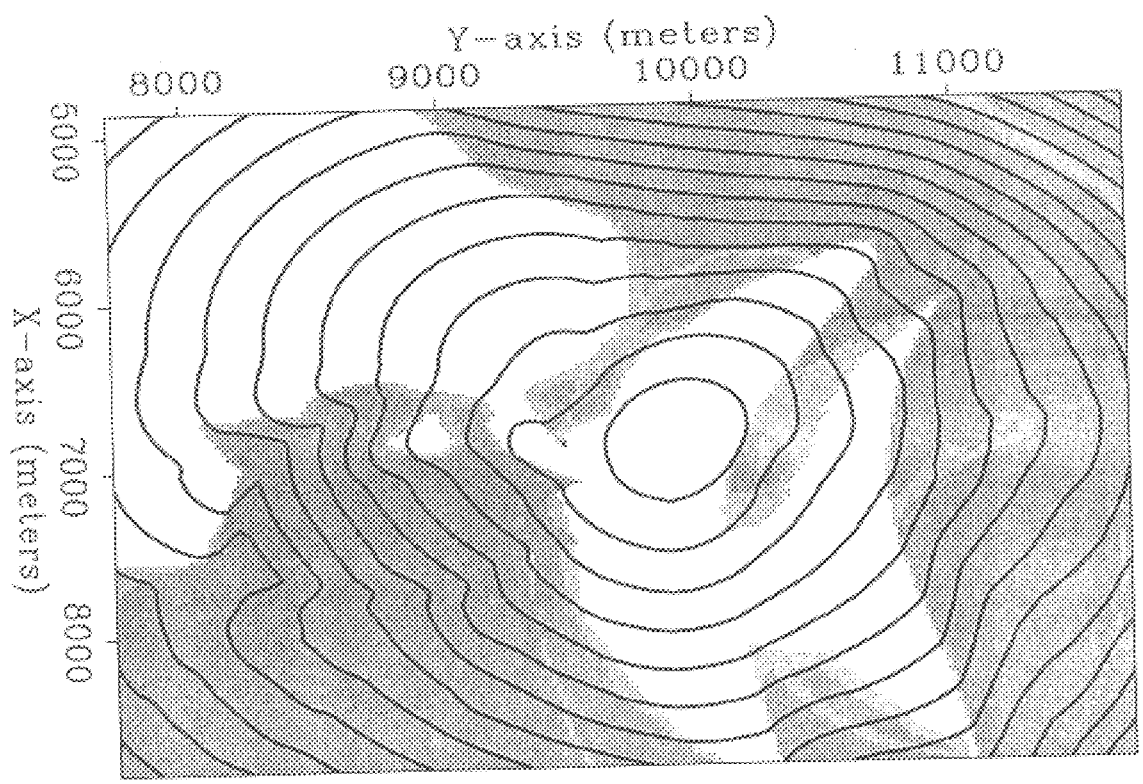
FIG. 6-B

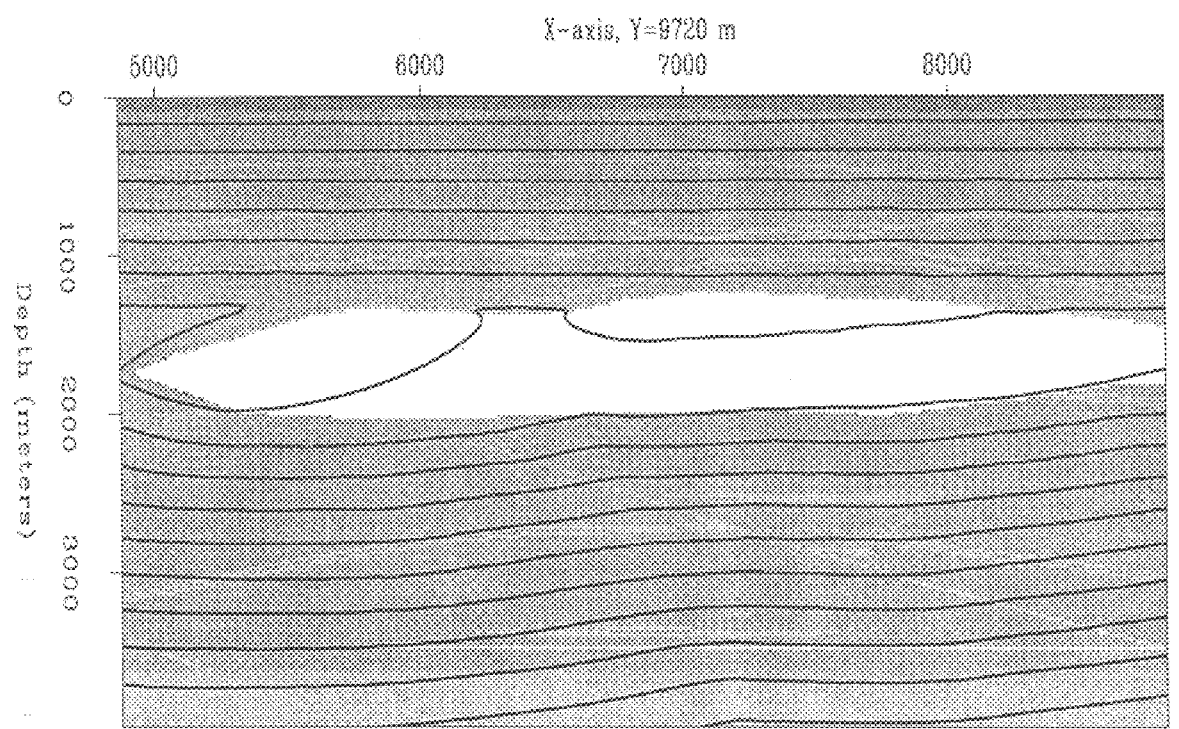
FIG. 7-A

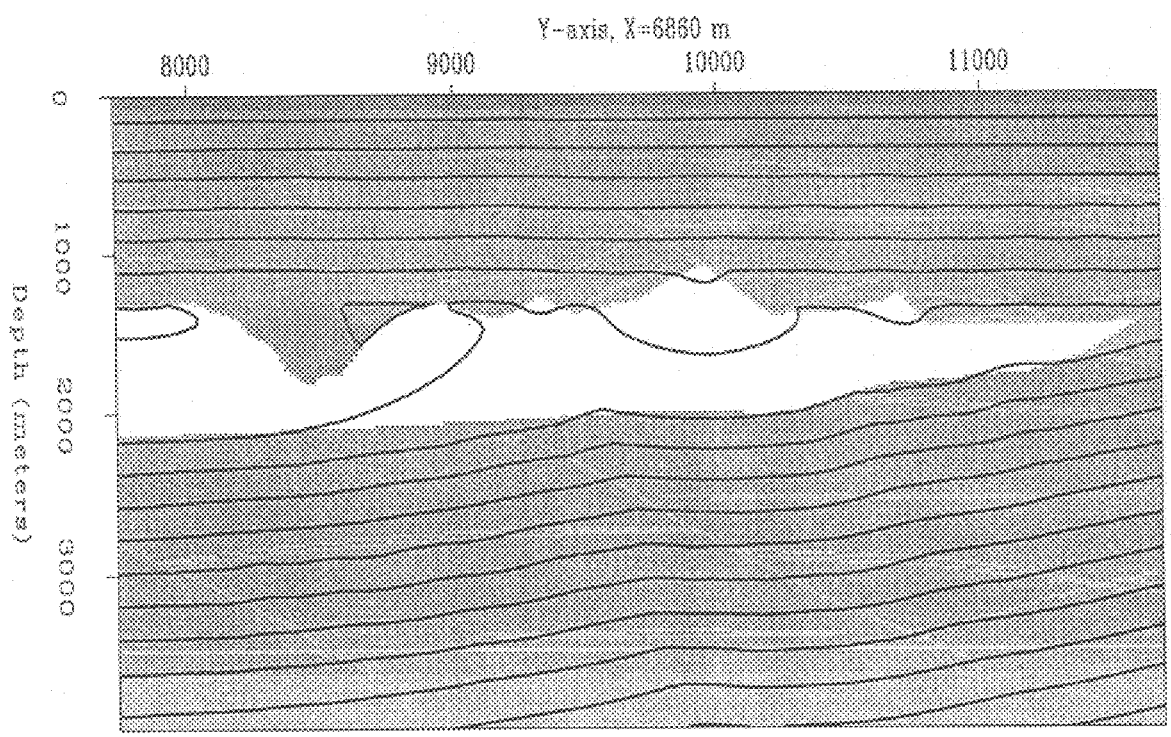
FIG. 7-B

THREE-DIMENSIONAL SEISMIC IMAGING OF COMPLEX VELOCITY STRUCTURES

RELATED APPLICATION DATA

This application is based on U.S. Provisional Patent Application No. 60/064,213 filed Nov. 4, 1997, herein incorporated by reference. This application is related to U.S. patent application Ser. No. 08/850,972, filed May 5, 1997, assigned to the assignee of the present invention, and herein incorporated by reference.

FIELD OF THE INVENTION

This invention relates to geophysical prospecting using seismic signals, and in particular to a three-dimensional data processing method suitable for accurately and efficiently processing seismic data for volumes having complex velocity structures.

BACKGROUND

Effectively searching for oil and gas reservoirs often requires imaging the reservoirs using three-dimensional (3-D) seismic data. Seismic data is recorded at the earth's surface or in wells, and an accurate model of the underlying geologic structure is constructed by processing the data. Imaging 3-D seismic data is perhaps the most computationally intensive task facing the oil and gas industry today. The size of typical 3-D seismic surveys can be in the range of hundreds of gigabytes to tens of terabytes of data. Processing such large amounts of data often poses serious computational challenges.

Obtaining high-quality earth images necessary for contemporary reservoir development and exploration is particularly difficult in areas with complex geologic structures. In such regions, conventional seismic technology may either incorrectly reconstruct the position of geological features or create no usable image at all. Moreover, as old oil fields are depleted, the search for hydrocarbons has moved to smaller reservoirs and increasingly hostile environments, where drilling is more expensive. Advanced imaging techniques capable of providing improved knowledge of the subsurface detail in areas with complex geologic structures are becoming increasingly important.

Many imaging techniques, such as techniques based on Kirchhoff migration, require computing traveltimes for the region of interest. Efficiently applying such imaging techniques to 3-D seismic information requires fast, robust, and accurate methods to compute traveltimes.

Commonly used traveltime computation techniques face a number of challenges. Ray tracing methods, while relatively accurate, often suffer from considerable complexity. Finite-difference schemes are typically simpler computationally, but often suffer from stability and accuracy issues. In particular, currently available finite-difference schemes often fail to adequately handle complex propagation effects in fields where complex geology and associated anomalous elastic variations are present.

A fast, accurate and unconditionally stable 3-D traveltime computation method would be an important tool in the arsenal of the seismic imaging geophysicist. A robust traveltime computation technique could be useful in many seismic data processing methods, including migration, datuming, modeling, and data acquisition design. Such a technique would allow improved use of three-dimensional (3-D) seismic data to characterize and delineate reservoirs and to monitor enhanced oil recovery (EOR) processes. A fast and robust traveltime computation method would be particularly useful for characterizing extremely complicated geological conditions such as those that exist below layers of salt in the Gulf of Mexico and in the overthrust regions of the Western United States. Better seismic images of complex subsurface geology can reduce development costs, as well as increase the amount of hydrocarbons recovered and the amount of national oil reserves.

SUMMARY

It is a primary object of the present invention to provide a method of accurately and efficiently processing seismic signals for a seismic exploration volume having a complex geological structure characterized by a complex velocity model. The method includes accurately and efficiently computing traveltimes for the volume. The traveltimes accurately characterize the propagation of the seismic signals through the volume. The seismic signals are processed using the traveltimes. Suitable seismic signal processing includes generating 3-D images of the volume, refining the velocity model for the volume, generating synthetic seismic signals for the volume, and optimizing the placement of sources and/or receivers for data acquisition.

The traveltime computation has a computational cost of order NlogN or less, where N is the number of grid points in the volume. The method accurately and robustly deals with the formation of cusps and corners in the traveltime advancement interface, topological changes in the advancing interface, and stability issues in three space dimensions.

The traveltime computation includes providing a set of accepted traveltimes for an accepted grid region in the volume, providing a set of tentative traveltimes for a set of trial grid points arranged in a narrow band around the accepted grid region, and arranging the set of tentative traveltimes on a heap. The minimum traveltime in the heap is selected and added to the set of accepted traveltimes. The grid point corresponding to the minimum traveltime (the minimum-traveltime gridpoint) is implicitly added to the accepted grid region. The neighbors of the minimum-traveltime grid point which are not in the accepted grid region are added to the set of trial grid points. Tentative traveltimes for the neighbors are computed/recomputed and put on the heap. The process continues by point-wise addition of the minimum traveltime in the heap at each position of the traveltime front, to advance the front until accepted traveltimes are computed for the entire grid region of interest.

In the preferred embodiment, the traveltime computation includes solving the eikonal equation in all the points of a 3-D grid. The stability and speed of the traveltime computation are made possible by following the wavefront propagation in a narrow band and solving the finite-difference eikonal stencil at points of minimum traveltime in the narrow band. Overturned wavefronts are resolved without additional effort. The speed of the traveltime computation is further improved by storing the narrow band traveltimes on a heap.

DESCRIPTION OF THE FIGURES

FIG. 2-A shows a binary tree representation of part of an arbitrary binary heap, including the top of the heap, according to the present invention.

FIG. 2-B shows an array representation of the heap of FIG. 2-A.

FIG. 3-A illustrates a set of accepted grid points, a narrow band array neighboring the accepted grid points, and far-away grid points for which traveltimes have not yet been determined, according to the present invention.

FIG. 3-B is a diagram similar to FIG. 3-A showing the accepted grid points after the addition of the minimum-traveltime gridpoint in the narrow band array to the accepted grid points.

FIGS. 5-A and 5-B show traveltime contours superimposed on the velocity model for respective orthogonal vertical slices through the SEG/EAGE Salt Model for a point source at the surface, according to the present invention.

FIGS. 6-A and 6-B show traveltime contours superimposed on the velocity model for respective horizontal slices through the SEG/EAGE Salt Model for a point source at the surface, according to the present invention.

FIGS. 7-A and 7-B show traveltime contours superimposed on the velocity model for respective orthogonal vertical slices through the SEG/EAGE Salt Model for a plane wave source at the surface, according to the present invention.

DETAILED DESCRIPTION

The following description illustrates the present invention by way of example and not necessarily by way of limitation.

A set of seismic signals for a seismic exploration volume of interest are first provided by well known methods. The seismic signals may be real data recorded on the earth's surface or within wells using geophones or hydrophones. The seismic signals may also be synthetic data corresponding to the earth's surface, to some underground surface or other locations. Synthetic data may be generated from real data, other synthetic data, velocity data, and/or petrophysical rock data. Methods suitable for generating synthetic data include modeling, migration, and datuming methods. Examples of such methods include Kirchhoff modeling, finite-difference modeling, phase-shift modeling, Kirchhoff migration, finite-difference migration, phase-shift migration, migration to zero offset (MZO), and controlled illumination migration, among others.

A velocity model for the volume is then provided by well-known methods. The velocity model is a 3-D array describing the distribution of velocities on a grid within the volume of interest. For simplicity, the term velocity will be used to refer to both speeds and slownesses within the model. The grid is preferably a cartesian (x-y-z) grid, although spherical, tetragonal, hexagonal or other grids may also be used. Determining a suitable velocity model for a given volume is well known in the art and will not be discussed here in detail.

Figure 1:
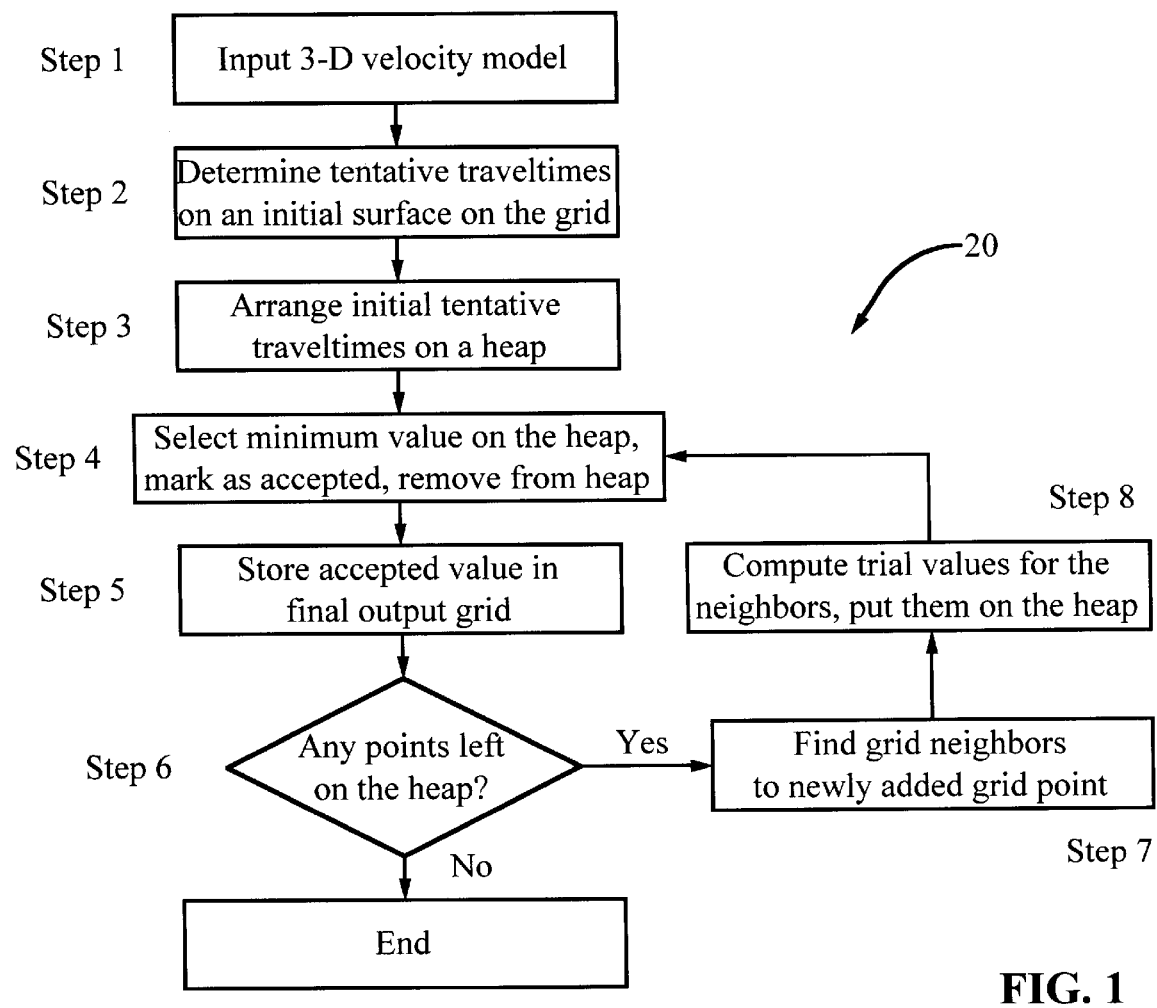
FIG. 1 is a flow chart outlining a preferred traveltime computation method of the present invention.

A set of traveltimes characterizing the propagation of the seismic signals within the volume is then generated as outlined below. FIG. 1 outlines the processing steps in a preferred traveltime computation method of the present invention. The velocity model is provided to a computer system of the present invention (step 1). A set of initial (primary) tentative seismic traveltimes on an initial surface within the volume is then generated (step 2). The set of initial traveltimes is a data array stored in the system memory or in some other storage device. The initial surface is generally the surface over which the seismic signals are recorded or simulated, but may also be any arbitrary surface within the velocity model. In general, the initial traveltimes lie in a narrow band situated adjacent to some accepted grid region for which traveltimes are known.

For seismic signals recorded using point sources at the earth surface, the initial surface is preferably defined by the grid points immediately adjacent to a point source. Such a point source could be used to define a zero traveltime. For seismic signals generated by simulating a plane-wave source at the earth surface, the initial surface can be a planar surface defined by grid points adjacent to the earth surface.

Figure 4:
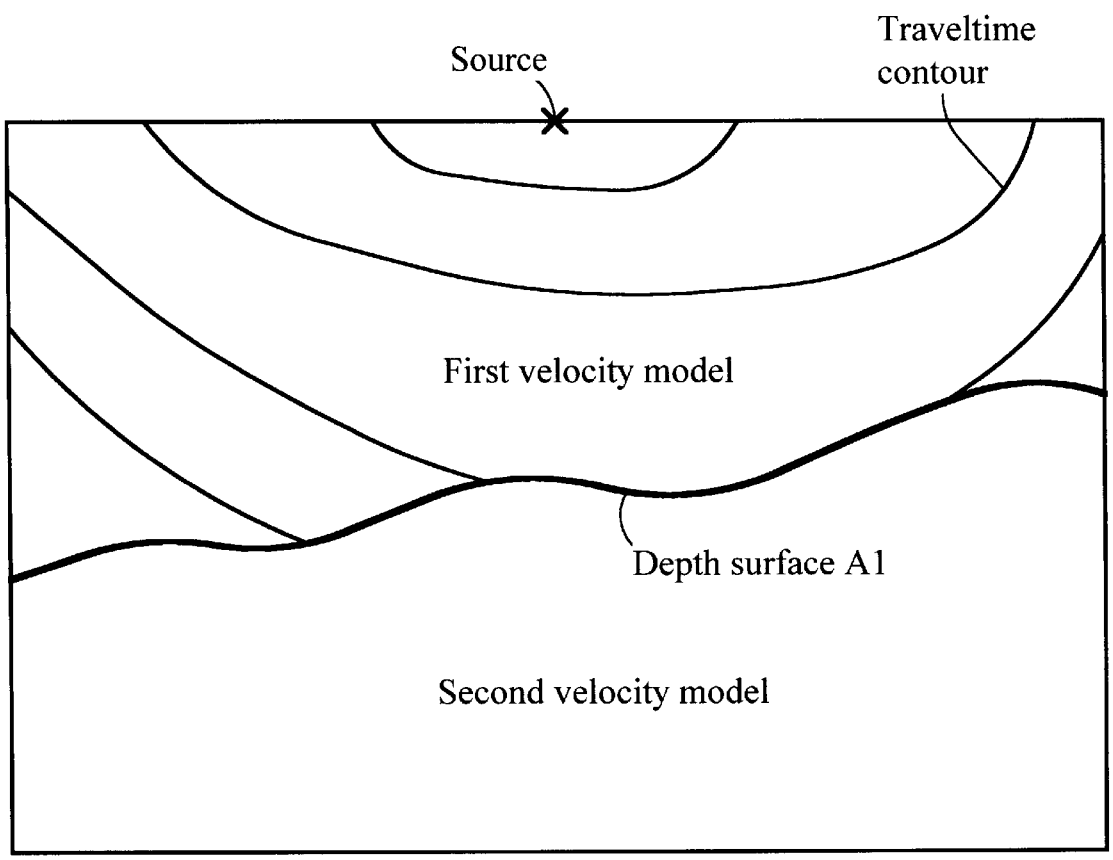
FIG. 4 illustrates an intermediate depth surface suitable for resetting the initial conditions for traveltime computation, according to an embodiment of the present invention.

The initial surface may also be any underground surface, for example a non-planar surface defining a velocity interface. FIG. 4 shows an intermediate underground depth surface A1 separating two subvolumes characterized by distinct velocity models. FIG. 4 also shows several traveltime contours within the upper subvolume. An underground initial surface such as surface A1 can be useful in a layer-stripping method in which traveltimes are first computed from the earth surface to the underground surface, and then from the underground surface onward. For information on layer-stripping and downward continuation see the above-referenced co-pending patent application Ser. No. 08/850,972.

The tentative traveltimes are preferably computed from accepted values and velocity model data using a finite-difference approximation to the eikonal equation. The eikonal equation can be represented as $$|\nabla u(x,y,z)|=s(x,y,z), \qquad [1]$$

where $u(x,y,z)$ is the traveltime field and $s(x,y,z)$ is the slowness function, defined as the inverse of the speed.

The tentative traveltimes are preferably determined according to the finite-difference approximation $$(\max(D_{ijk}^{-x}u,-D_{ijk}^{+x}u,0)^2+\max(D_{ijk}^{-y}u,-D_{ijk}^{+y}u,0)^2+\max(D_{ijk}^{-z}u,-D_{ijk}^{+z}u,0)^2)^{1/2}=s_{ijk}, \qquad [2]$$

where the backward and forward operators $D^{-x}$ and $D^{+x}$ are defined as $$D^{-x}u = \frac{u(x)-u(x-h)}{h}, \quad D^{+x}u = \frac{u(x+h)-u(x)}{h}, \qquad [3]$$

and h is the sampling distance in the x direction. The operators $D^{-y}$, $D^{+y}$, $D^{-z}$ and $D^{+z}$ are defined in a similar manner, using the appropriate grid sampling. For each point (x,y,z,) in the grid, eq. [2] can be used to compute a value of $u(x,y,z)$ from a corresponding value of $s(x,y,z)$, the local grid spacing, and the traveltimes for neighboring gridpoints. For further information on the approximation of eq. [2] see the article by Rouy and Tourin "A Viscosity Solutions Approach to Shape-From-Shading," *SIAM J. Num. Anal.* 29:867–884 (1992).

Other methods for computing traveltimes are suitable for use in the present invention. For example, the tentative traveltimes can be determined using the relation $$|\nabla u| \approx (\max(D_{ijk}^{-x}u, 0)^2 + \min(D_{ijk}^{+x}u, 0)^2 + \qquad [4]$$
$$\max(D_{ijk}^{-y}u, 0)^2 + \min(D_{ijk}^{+y}u, 0)^2 +$$
$$\max(D_{ijk}^{-z}u, 0)^2 + \min(D_{ijk}^{+z}u, 0)^2)^{1/2}$$

where the operators $D^{-x}$, $D^{+x}$, etc. are defined above. For information on the approximation of eq. [4] see the article by Osher and Sethian in *J. Computational Physics* 79:12–49 (1988).

Referring to FIG. 1, the initial tentative traveltimes are arranged on a heap (step 3). For information on heaps and heapsorting see for example Cormen, *Introduction to Algorithms*, MIT Press, Cambridge, Mass., 1990, Chapter 7 (pp. 140–152). Briefly, a heap can be viewed as a tree or a corresponding ordered array. FIGS. 2-A and 2-B schematically illustrate a sample binary heap represented as a tree and as an array, respectively. The value stored at each heap position is shown underneath the index of the position. The values in the heap are shown for illustrative purposes only, and do not represent actual tentative seismic traveltimes. A binary heap has the property that the value at any given "child" position (i) is always larger than or equal to the value at its "parent" position (int(i/2)).

The minimum traveltime in the heap is stored at the top of the heap. Arranging the tentative traveltime array on a heap effectively identifies and selects the minimum traveltime in the array. The minimum traveltime on the heap identifies a corresponding minimum-traveltime grid point. Values can be added to or removed from the heap. Adding or removing a value to/from the heap includes re-arranging the array so as to satisfy the heap condition ("heapifying" the array). "Heapifying" an array can be achieved by recursively exchanging the positions of any "parent"-"child" pair violating the heap property until the heap property is satisfied across the heap. Adding or removing a value from a heap generally has a computational cost of order O(logN), where N is the number of heap elements.

Referring again to FIG. 1, the minimum traveltime in the heap (the traveltime at the top of the heap) is removed from the heap (step 4), and saved as an accepted traveltime in the final traveltime output grid (step 5). The narrow band array resulting after the removal of the minimum traveltime is then re-ordered as a heap ("heapified").

In step 6, it is checked whether there are any traveltimes left on the heap. If no traveltimes are left on the heap, the method is ended. The output grid then contains accepted traveltimes for all grid points in the volume of interest. If the heap contains at least some traveltimes, the method continues on to step 7.

In step 7, the non-accepted neighbors to the accepted grid points are determined. The non-accepted neighbors include neighbors in the narrow band and neighbors outside of the narrow band. Tentative traveltimes for all non-accepted neighbors are computed/recomputed according to eq. [2], and the tentative traveltimes are inserted in the narrow band array (step 8). The narrow band array is then again heapified. Steps 4–8 are then repeated for the updated heap until there are no points left on the tentative traveltime heap. Steps 4–8 form a loop 20.

FIGS. 3-A and 3-B show sample grid points to which the steps illustrated in FIG. 1 are applied. As illustrated in FIG. 3-A, a Close narrow band CG(k) is adjacent to an Accepted grid region AG(k). Further away from the accepted points are Far points for which accepted or tentative traveltimes have not yet been computed. A minimum-traveltime point 40 is added to AG(k) to generate AG(k+1), as shown in FIG. 3-B. Point 40 corresponds to the minimum traveltime in CG(k). Point 40 is removed from CG(k), and a Far neighbor 50a is added to CG(k) to generate CG(k+1).

A tentative traveltime for point 50a is then computed as described above and added to the narrow band array. The tentative traveltime for a point 50b, which remains in the narrow band after the addition of point 40, is recomputed using the accepted traveltime for point 40. The traveltime for point 50b is then updated in the narrow band array, and the narrow band array is re-arranged as a heap if necessary.

Accepted traveltimes computed using the above-described method accurately characterize the propagation of seismic signals in volumes having complex velocity structures. The seismic signals are processed using the accepted traveltimes. The processing preferably comprises generating a 3-D image of the volume by pre-stack or post-stack Kirchhoff migration. Examples of other processing methods employing the accepted traveltimes include VSP migration, controlled illumination migration, velocity analysis, Kirchhoff modeling, Kirchhoff datuming, variable velocity migration to zero-offset, tomography, controlled stack, and data acquisition design.

The traveltime computation method can be better understood by considering the observation that, at its core, the problem of computing first arrival traveltimes is equivalent to tracking an interface advancing with a speed normal to itself. An important goal in such an interface advancement is to accurately and robustly deal with the formation of cusps and corners, topological changes in the propagating interface, and stability issues in three space dimensions.

The present traveltime computation method addresses these issues by advancing the traveltime front in an upwind fashion selectively at the interface point having the minimum traveltime. The traveltime computation rests on the assumption that information propagates "one way", that is, from smaller values of u(x,y,z) to larger values. The present invention, in its preferred implementation, solves the eikonal equation by building the solution outwards selectively from the smallest u(x,y,z) value. The process of recomputing the u(x,y,z) values at upwind neighboring points cannot yield a value smaller than any of the accepted points. Thus, we can march the solution outwards, always selecting the narrow band grid point with minimum trial value for u(x,y,z), and readjusting neighbors, as shown in FIGS. 3-A and 3-B. Another way to look at the method is that each minimum trial value begins an application of Huygens' principle, and the expanding wave front touches and updates other trial values.

The method correctly deals with the development of corners and cusps in the evolving solution, allowing the method to accurately characterize the propagation of signals through complex velocity structures. The finite-difference approximation to the eikonal equation is resolved to machine precision in each point of the grid, making the accuracy of the method dependent only on the grid size and the order of the finite-difference scheme used.

The traveltime computation method is made fast by confining the "building zone" to a narrow band around the front, and further by arranging the narrow band traveltimes on a heap. Arranging the narrow band traveltimes on a heap allows a reduction in the computational cost of rearranging the tentative traveltimes when elements are added and/or removed from the tentative traveltime set. The cost of a heap operation is $\log(N_{NB})$, where $N_{NB}$ is the total number of traveltimes in the narrow band. The total number of operations needed to solve the eikonal equation on the 3-D Cartesian grid is then $O(N\log(N_{NB}))$, where N is the total number of gridpoints. The logarithmic dependence of the computational cost on the total number of traveltimes is the key to the remarkable speed of the preferred method of the present invention.

The technique also can be extended to more general static Hamiltonians of the form $$H(Du,x)=0 \qquad [5]$$

where Du represents the derivatives in each of the component variables $u_{x1}, \ldots, u_{xN}$. In all cases, the scheme is extremely fast; if there are N total points in the grid, then the scheme solves the equation in O(NlogN) steps. For further information on eq. [5] see Sethian, *Level Set Methods*, Cambridge University Press, 1996.

The following example is intended to illustrate the invention, and should not be construed to limit the invention.

EXAMPLE

To establish the suitability of the above-described method for characterizing complex velocity structures, we evaluated the preferred method on the 3-D SEG/EAGE salt dome velocity model described by Aminzadeh et al. ("3-D Modeling Project: Third Report," *The Leading Edge* 14:125–128 (1995)). The salt dome model was designed to contain major complex features that are characteristic to complicated Gulf of Mexico salt structures. It includes a northwesterly plunging stock, a secondary reactivation crest southward of the stock, a low-relief eastern flank, a faulted southern flank with a toe thrust, a rounded overhang on the west flank, five sands that are gas charged (at least one contains both a gas/oil and an oil/water contact), and a shale sheath that is modeled to be geopressured. The sea floor map exhibits a counter-regional fault scarp, a bathymetric rise associated with the sill crest, and a shelf break at the southeast end of the model. The overall model size is 13.5×13.5×4.2 km on a 20 m grid.

FIGS. 5-A through 7-B show slices through the model generated using the preferred method of the present invention, as described above. FIGS. 5-A and 5-B show vertical slices through the model in orthogonal Y and X directions, respectively. The 100×100×100 3-D grid represented in FIGS. 5-A and 5-B was sampled at $\Delta x=\Delta y=\Delta z=40$ m, and was obtained by subsampling by a factor of two the SEG/EAGE model. The source is situated at the surface, in the middle of the X-Y plane (Y=9720 m, X=6860 m). The Y-section (FIG. 5-A) was obtained for a constant X=6860 m, while the X-section (FIG. 5-B) was obtained for a constant Y=9720 m.

FIGS. 6-A and 6-B show horizontal slices through the traveltime cube at depths of 1180 m and 1380 m, respectively, for a point source at the surface. FIGS. 7-A and 7-B show respective orthogonal vertical slices through the traveltime cube for a plane wave source at the surface. FIG. 7-A shows an X-section for a constant Y=9720 m, while FIG. 7-B shows a Y-section for a constant X=6860 m.

As illustrated in the figures, the method robustly handles the cusps and corners formed in the traveltime front. Such cusps are frequent sources of instabilities for conventional finite-difference eikonal solvers, since they include singular points where rays cross or the traveltime gradient is discontinuous.

It will be clear to one skilled in the art that the above embodiments may be altered in many ways without departing from the scope of the invention. For example, one need not store actual traveltime values, but may store and/or sort data which can be used to reconstruct actual traveltime values, such as the inverse of traveltime values. Similarly, as is apparent to the skilled artisan, actual velocities or slownesses can be used as convenient. Accordingly, the scope of the invention should be determined by the following claims and their legal equivalents.

What is claimed is:

1. A computer-implemented three-dimensional seismic data processing method comprising:

a) providing a set of seismic signals for a seismic exploration volume;

b) providing a complex velocity model for said volume;

c) generating a set of accepted traveltimes for said volume by
      providing accepted traveltimes for an accepted grid region within said volume,
      providing tentative traveltimes for a set of trial grid points arranged in a narrow band around said accepted grid region,
      arranging said tentative traveltimes on a heap,
      selecting a minimum traveltime from said heap as an accepted traveltime, thereby adding to said accepted grid region a minimum-traveltime grid point corresponding to said minimum traveltime,
      adding a neighbor of said minimum-traveltime grid point which is not in said accepted grid region to said set of trial grid points,
      computing a tentative traveltime for said neighbor using said velocity model and said accepted traveltimes,
      putting said tentative traveltime for said neighbor on said heap, and
      advancing said accepted grid region to generate said set of accepted traveltimes; and d) processing said seismic signals using said set of accepted traveltimes to characterize a propagation of said seismic signals through said volume.

2. The method of claim 1 wherein said processing said seismic signals comprises generating an image of said volume.

3. The method of claim 2 wherein said image is generated by Kirchhoff migration.

4. The method of claim 1 further comprising using said minimum traveltime to recompute a tentative traveltime for a trial grid point neighboring said neighbor.

5. The method of claim 1 wherein said computing said tentative traveltime for said neighbor comprises employing a finite-difference solution to the eikonal equation.

6. The method of claim 5 wherein said finite-difference solution comprises a gradient term $$|\nabla u| \approx (\max(D_{ijk}^{-x}u, 0)^2 + \min(D_{ijk}^{+x}u, 0)^2 +$$
$$\max(D_{ijk}^{-y}u, 0)^2 + \min(D_{ijk}^{+y}u, 0)^2 +$$
$$\max(D_{ijk}^{-z}u, 0)^2 + \min(D_{ijk}^{+z}u, 0)^2)^{1/2}$$

7. The method of claim 5 wherein said finite-difference solution comprises a gradient term $$|\nabla u|=(\max(D_{ijk}^{-x}u,-D_{ijk}^{+x}u,0)^2+\max(D_{ijk}^{-y}u,-D_{ijk}^{+y}u,0)^2+\max(D_{ijk}^{-z}u,-D_{ijk}^{+z}u,0)^2)^{1/2}.$$

8. The method of claim 5 wherein said grid points are arranged on a cartesian grid.

9. The method of claim 5 wherein said grid points are arranged on a spherical grid.

10. A computer-implemented three-dimensional seismic imaging method comprising:

a) providing accepted traveltimes for an accepted grid region of a seismic exploration volume having a complex velocity structure;

b) providing tentative traveltimes for a set of close grid points situated one grid point away from said accepted grid region, said tentative traveltimes for said set of close grid points being arranged on a heap;

c) selecting a minimum traveltime from said tentative traveltimes, said minimum traveltime corresponding to a minimum-traveltime grid point;

d) saving said minimum traveltime as an accepted traveltime, thereby adding said minimum-traveltime grid point to said accepted grid region;

e) adding neighbors of said minimum-traveltime grid point which are not in said accepted grid region to said set of close grid points;

f) computing tentative traveltimes for said neighbors using a finite-difference approximation to the eikonal equation;

g) putting said tentative traveltimes for said neighbors on said heap; and h) employing said accepted traveltimes to generate an image of said volume.

11. The method of claim 10 wherein said image is generated by Kirchhoff migration.

12. The method of claim 10 further comprising recomputing tentative traveltimes for close grid points one grid point away from said minimum-traveltime grid point, said recomputing employing said minimum traveltime.

13. A computer-implemented three-dimensional seismic imaging method comprising:

a) computing accepted traveltimes for grid points of a seismic exploration volume having a complex velocity structure, by establishing a narrow band of grid points adjacent to a traveltime front at each of a plurality of positions of said traveltime front in said volume, establishing a heap of tentative traveltimes for said narrow band, and saving a minimum traveltime from said heap as an accepted traveltime in a traveltime output grid, to advance said front at a minimum traveltime grid point corresponding to said minimum traveltime; and b) imaging said volume using said accepted traveltimes.

14. The method of claim 13 wherein said imaging said volume comprises processing a set of seismic signals for said volume by Kirchhoff migration.

15. The method of claim 13 further comprising recomputing a tentative traveltime for a grid point neighboring said minimum traveltime grid point, said recomputing employing said minimum traveltime.

16. A three-dimensional seismic imaging apparatus comprising:

a) means for providing a set of seismic signals for a seismic exploration volume;

b) means for providing a complex velocity model for said volume;

c) means for generating a set of accepted traveltimes for said volume, including means for providing accepted traveltimes for an accepted grid region within said volume, means for providing tentative traveltimes for a set of trial grid points arranged in a narrow band around said accepted grid region, means for arranging said tentative traveltimes on a heap, means for selecting a minimum traveltime from said heap as an accepted traveltime, thereby adding to said accepted grid region a minimum-traveltime grid point corresponding to said minimum traveltime, means for adding a neighbor of said minimum-traveltime grid point which is not in said accepted grid region to said set of trial grid points, means for computing a tentative traveltime for said neighbor using said velocity model and said accepted traveltimes, means for putting said tentative traveltime for said neighbor on said heap, and means for advancing said accepted grid region to generate said set of accepted traveltimes; and d) means for processing said seismic signals using said set of accepted traveltimes to characterize a propagation of said seismic signals through said volume.

17. The apparatus of claim 16 wherein said means for processing said seismic signals comprises means for generating an image of said volume.

18. The apparatus of claim 17 wherein said image is generated by Kirchhoff migration.

19. The apparatus of claim 16 further comprising means for using said minimum traveltime to recompute a tentative traveltime for a trial grid point neighboring said neighbor.

20. The apparatus of claim 16 wherein said means for computing said tentative traveltime employs a finite-difference solution to the eikonal equation.

21. The apparatus of claim 20 wherein said finite-difference solution comprises a gradient term $$|\nabla u| = (\max(D_{ijk}^{-x}u, 0)^2 + \min(D_{ijk}^{+x}u, 0)^2 +$$
$$\max(D_{ijk}^{-y}u, 0)^2 + \min(D_{ijk}^{+y}u, 0)^2 +$$
$$\max(D_{ijk}^{-z}u, 0)^2 + \min(D_{ijk}^{+z}u, 0)^2)^{1/2}$$

22. The apparatus of claim 20 wherein said finite-difference solution comprises a gradient term $$|\nabla u| = (\max(D_{ijk}^{-x}u, -D_{ijk}^{+x}u, 0)^2 + \max(D_{ijk}^{-y}u, -D_{ijk}^{+y}u, 0)^2 + \max(D_{ijk}^{-z}u, -D_{ijk}^{+z}u, 0)^2)^{1/2}.$$

23. The apparatus of claim 20 wherein said grid points are arranged on a cartesian grid.

24. The apparatus of claim 20 wherein said grid points are arranged on a spherical grid.

25. A three-dimensional seismic imaging apparatus comprising:

a) means for providing accepted traveltimes for an accepted grid region of a seismic exploration volume having a complex velocity structure;

b) means for providing tentative traveltimes for a set of close grid points situated one grid point away from said accepted grid region, said tentative traveltimes for said set of close grid points being arranged on a heap;

c) means for selecting a minimum traveltime from said tentative traveltimes, said minimum traveltime corresponding to a minimum-traveltime grid point;

d) means for saving said minimum traveltime as an accepted traveltime, thereby adding said minimum-traveltime grid point to said accepted grid region;

e) means for adding neighbors of said minimum-traveltime grid point which are not in said accepted grid region to said set of close grid points;

f) means for computing tentative traveltimes for said neighbors using a finite-difference approximation to the eikonal equation;

g) means for putting said tentative traveltimes for said neighbors on said heap; and h) means for employing said accepted traveltimes to image said volume.

26. A three-dimensional seismic imaging apparatus comprising:

a) accepted traveltime storage means comprising a set of accepted traveltimes stored therein, said set of accepted traveltimes characterizing an accepted grid region within a seismic exploration volume having a complex velocity structure;

b) traveltime computation means for providing a set of tentative traveltimes for a narrow band around said accepted grid region using a finite-difference solution to the eikonal equation;

c) tentative traveltime storage means for storing said tentative traveltimes as a heap;

d) minimum traveltime selection means for selecting a minimum traveltime from said set of tentative traveltimes, and for storing said minimum traveltime in said accepted traveltime storage means as an accepted traveltime; and e) imaging means for generating an image of said volume using said set of accepted traveltimes.

* * * * *